Patented Sept. 6, 1949

2,480,901

UNITED STATES PATENT OFFICE 2,480,901

PROCESS FOR PREPARING FLUXING MATERIALS

James J. Bowden and John S. Suda, Warren, Ohio; said Suda assignor to said Bowden No Drawing. Application July 15, 1946, Serial No. 683,782

7 Claims. (Cl. 75—53)

This invention relates to the production of fluxing agents for use in open-hearth, blast-furnace, and electric furnace processes. It has for its general purpose to produce fluxing agents from materials which are themselves fluxes but which, because of the finely-divided, or dusty, condition in which they exist, have heretofore been considered incapable of efficient utilization for fluxing purposes, and some of which are the dross or waste resulting from the production of articles of manufacture. Because of their fineness, the dusty particles tend to float in the air when these fluxes are introduced as such into open hearth furnaces and, because of such floating, contact and attack the checkers, banks, walls, bottoms and brickwork of said furnaces and, due to their scorifying action, will result in damage to, and shorter life in, such parts.

By the treatment set forth hereinafter to which we subject these dusty fluxes, it is not only possible to facilitate their introduction to the furnaces but also to keep them from contacting and injuring the parts referred to while also enabling them to exercise an important influence on the operations and control of the oxide phase of the final slag in open hearth furnace processes.

More particularly, our invention comprises so treating these fluxing materials as to render them capable of being formed into briquettes possessing sufficient crush-resistant strength to enable them to be effectively utilized in the foregoing processes.

More limitedly, our invention consists in effectively utilizing aluminum hydroxide as the cementing agent for binding into homogeneous masses, capable of being formed into such briquettes, the discrete particles of which these fluxing materials are composed.

Still more limitedly, our invention comprises the manufacture of crush-resistant briquettes, produced in the manner described, which will ensure the presence in the final slag in the open-hearth furnace process of from 1½% to 7% of $Al_2O_3$, the advantages resulting from which are set forth in our Patent No. 2,283,622, issued May 19, 1942.

Our invention is particularly applicable to the production of crush resistant briquettes of fluxing material comprising the dross or waste product resulting from the melting of aluminum in contact with air in the manufacture and processing of aluminum products; from corundum waste or dross resulting from the manufacture of abrasives; from lime (CaO or $Ca(OH)_2$); and from fluorspar in the production of which as a flux it has been necessary (because of the present decrease in the quality and available quantity of the same) to subject it to a washing and concentration which results in its essential production as a powder. All of the foregoing fluxes are in such a finely divided condition that they tend to float in the air as a dust, with resultant deleterious effect upon the parts of the furnaces into which they may be introduced.

Reverting first to the waste product resulting from the melting of aluminum in contact with air in the manufacture and processing of aluminum products, this waste product contains a large proportion of alumina as well as metallic aluminum and an appreciable proportion of other aluminum compounds. In some plants this waste product or dross is crushed and screened for the purpose of recovering, as far as possible, the metallic aluminum contained therein. However, after the crushing and screening operation and before the waste product has been subjected to the weather for a rather prolonged period of time, the resultant fine dust constitutes a fluxing agent consisting essentially of from 4 to 10 parts by weight of aluminum, from 45 to 70 parts by weight of alumina, and from 16 to 33 parts by weight of aluminum nitride.

In order to render this waste product capable of utilization, it must first have been crushed and passed through a screen, preferably of at least 16-mesh fineness, then made into a thin slurry, conveniently by means of a concrete mixer, using, for the liquid constituent of the slurry, a solution of an alkali hydroxide wherein the concentration of the alkali will vary from 1% to 10% of the weight of the solvent liquid. For example, we have made satisfactory briquettes by mixing 125 CC of a solution of 5% sodium hydroxide with 250 grams of the waste product (dross) and also when 225 CC of a 5% solution of sodium hydroxide was mixed with 600 grams of the waste product (dross). The hydroxide employed reacts upon the reactive aluminum constituents of the waste product (the aluminum and the aluminum nitride) to produce aluminum hydroxide—the active binding agent; and the reactive aluminum constituents, where the waste product has not been exposed to the weather for a prolonged time, will be present in sufficient proportions to produce all of the aluminum hydroxide requisite to secure the necessary binding action, upon the dusty particles and also, in the case of open hearth furnace operations, to insure the presence in the final slag of from 1½% to 7% of alumina. Should an excess of hydroxide (as, for instance, sodium hydroxide) be employed in the treatment of this waste product, a corresponding aluminate (for example, sodium aluminate) will be produced which is water soluble. In such an instance, said soluble sodium aluminate should be converted to the insoluble aluminum hydroxide through suitable means, such as by the use of carbonic acid or a solution of ammonium chloride.

Where this waste product has been exposed to the weather for a period of time sufficient to reduce the available aluminum therein to less than 1% by weight of aluminum per ton of waste product, or should a particular sample of the same analyze less than 1% by weight of available aluminum per ton of waste product, sufficient aluminum, preferably in the form of shavings, should be added thereto in order to produce, in the final analysis, a proportion of aluminum hydroxide ample to insure the necessary binding action upon the particles which are united by pressure in the briquetting operation, with a residual amount of uncombined metallic aluminum. This proportion of available aluminum should be at least 1% by weight per ton of waste product, although any amount of aluminum in excess thereover would be beneficial. On the basis of 1% by weight of aluminum and 89 pounds of sodium hydroxide per ton of waste product, there will be obtained approximately 58 pounds of aluminum hydroxide per ton, and this amount will be sufficient to constitute an effective binding agent. We have also found that from 39.5 to 52.5 pounds of sodium hydroxide per ton of the above waste product has, where aluminum is present in a proportion of at least 1% by weight per ton of said waste product, produced a quantity of aluminum hydroxide sufficient to constitute the aforesaid effective binding agent. Obviously other alkali hydroxides may be employed for the production of the essention aluminum hydroxide, such as potassium hydroxide, ammonium hydroxide, calcium hydroxide, or a mixture of the same or of any two of the same, and the percentage of such other alkali hydroxides per ton of waste product flux (when used either alone or in admixture with one another), and the equivalent weight of the same per ton of waste product flux, when so used, can be readily ascertained by comparison of their respective molecular weights with the molecular weight of sodium hydroxide.

The waste product and the alkali hydroxide having been made into a slurry in the manner described, the resulant material is then subjected to a pressure of from 500 to 30,000 pounds per square inch and formed into briquettes. The briquettes are then dried, preferably at temperatures of from 90° to 260° C. which will tend to prevent the possibility of excessive crystal growth that normally takes place when the drying is permitted to go on at the lower, hence slower, drying room temperatures.

The pressures employed in the briquetting operation will vary widely, depending upon the manner in which the briquettes are to be handled after their production. Where they are handled carefully and where crush-resistance is not a great factor, they may be formed under the minimum degree of pressure mentioned. On the other hand, where the briquettes are to be subjected to unusually severe handling and treatment, and wherein they are subjected to severe crushing strains, it may be necessary to utilize in the briquetting operation pressures as high as the upper limits specified. Variations in pressure of from 1000 to 6000 pounds per square inch in the briquetting operation will impart sufficient crush-resistance to the briquettes to enable them to withstand, without fracture or crushing, all ordinary variations in the severity of the treatment to which they are subjected.

Our best method of forming the aluminum hydroxide binding agent is by the use of the alkali hydroxides set forth hereinbefore. However, it can also be formed through the action of hydrolysis as when an aluminum salt, such as aluminum acetate, or the various alums, are dissolved in water which is appreciably alkaline.

In practice, we prefer to use sodium hydroxide as the alkali hydroxide because of its strength, cheapness, and effectiveness per unit weight; and we also prefer to employ the same in a solution wherein its concentration will be approximately 5% of the weight of the solvent liquid.

The manner in which the foregoing waste product has been treated herein, in order to form briquettes therefrom, is substantially the same as the manner of treating the same which is set forth in our application Serial No. 525,760, filed March 9, 1944, now abandoned, of which this application is a continuation in part.

The dusty dross or waste product resulting from the manufacture of abrasives from corundum necessarily contains a large proportion of alumina. While the presence of alumina is advantageous in effecting the control of the oxide phase of the final slag in open hearth processes, it is not converted into aluminum hydroxide by making a slurry of this product with a solution of alkali hydroxide. It will be necessary, therefore, to incorporate aluminum with this waste product in a form in which it can be converted into a hydroxide. We preferably employ for this purpose aluminum shavings and mix the same with the dusty waste product in such proportion as to insure the presence in the mixture of at least 1% of available aluminum in a ton of the waste product. This mixture having been formed, the product will be treated in the same manner as set forth in connection with the preceding waste product, thereby to produce from the same briquettes possessing sufficient crush-resistant strength to render them capable of commercial utilization in open-hearth, blast-furnace and electric-furnace processes.

Where dusty fluorspar is the flux to be treated, sufficient aluminum, either in its metallic form or in one or more of the other reactive forms, is mixed therewith in a proportion to ensure the presence of at least 1% of aluminum to 1 ton of the fluorspar. The mixture is then made into a thin slurry and briquetted in the same manner as are the two preceding dusty fluxing materials. The reactive aluminum may be incorporated into the dusty fluorspar by mixing therewith a sufficient proportion of the waste product resulting from the melting of aluminum in contact with air in the manufacturing and processing of aluminum products. The proportion of the waste product used depends upon its comparative freshness and percentage of alkali reactive aluminum products present as well as its accessibility. Where the said waste product is fresh or the alkali reactive aluminum products are present in a quantity or percentage to produce a sufficient proportion of aluminum hydroxide to constitute a binding agent, a mixture of as little as ten percent by weight of the waste product with ninety percent by weight of the fluorspar provides all of the alkaline reactive aluminum products which are requisite to produce a sufficient proportion of aluminum hydroxide to constitute a binding agent. Dependent upon the proportion of fluorspar to waste product, it may or may not be necessary to incorporate additional aluminum therewith. However, where the waste product is in a fresh condition, or is high enough in alkaline reactive aluminum products, its utilization in a proportion as little as 10 parts by weight to 90 parts by weight of the fluorspar will render the use of additional aluminum unnecessary.

Where lime (CaO or Ca(OH)$_2$) is the flux to be formed into briquettes, it will be subjected to the same treatment as is set forth in connection with fluorspar.

While the aluminum hydroxide which serves as the binding agent in the treatment of the foregoing finely divided fluxes is preferably that which is produced by the reaction of one or more of the foregoing alkali hydroxides upon reactive aluminum, it may be incorporated directly, as such, from an extraneous source, which could be Portland cement mixed with water. Inasmuch as Portland cement, through the action of hydrolysis when mixed with water, is considered as producing aluminum hydroxide along with other compounds such as silicic acid, we wish to make use of this property as a binder in addition to the advantage obtained therein where an added aluminum compound is introduced into the slag, not only to combine with a portion of the iron oxide of the slag but also to enhance the thinning properties of the fluxes mentioned.

When Portland cement is thus employed, the method of producing the briquettes depends largely on the quantity of cement used; i. e., if the percentage is high (1 cement to 3 flux) little or no pressure is required, but with only a nominal percentage (say 3% cement to 97% flux) pressures of from 500 to 30,000 pounds per square inch have been found beneficial.

Having thus described our invention, what we claim is:

1. The process of manufacturing a fluxing agent from a finely divided flux which comprises making a slurry from said flux and a solution of at least one alkali hydroxide in the presence of aluminum, the alkaline hydroxide being present not materially less than the molecular equivalent of 89 lbs. of sodium hydroxide per ton of flux and the water being present in the proportion of about 35% to 50% of the weight of the flux, the aforesaid solution being of such strength and the aluminum being present in such proportion as to enable a sufficient amount of aluminum hydroxide to be produced to serve as a binder for the discrete particles of the flux, and subjecting the resultant material to a heavy pressure sufficient to form the same into crush-resistant briquettes, said flux comprising at least one material from the group consisting of fluorspar and aluminum dross.

2. In the process set forth in claim 1, drying the briquettes at temperatures of from 90° to 260° C.

3. The process of manufacturing a fluxing agent from a finely divided flux substantially devoid of reactive aluminum which comprises adding at least 1% by weight of reactive aluminum to the said flux, making a slurry of said flux and reactive aluminum with a solution of at least one alkali hydroxide, the alkaline hydroxide being present not materially less than the molecular equivalent of 89 lbs. of sodium hydroxide per ton of flux and the water being present in the proportion of about 35% to 50% of the weight of the flux, the reactive aluminum and the alkali hydroxide being present in proportions to produce sufficient aluminum hydroxide to act as a binding agent for the discrete particles of the flux, forming the resultant material into briquettes under a pressure of from 500 to 30,000 lbs. per square inch and drying the same under an elevated temperature, said flux consisting of fluorspar.

4. The process of making a fluxing agent from a finely divided flux containing reactive aluminum in an insufficient proportion to be converted into sufficient aluminum hydroxide to form a binding agent for the discrete particles of said flux, said process including adding a sufficient quantity of reactive aluminum to said flux to compensate for the deficiency of the former, making a slurry of the flux, thus augmented, with a solution of at least one alkali hydroxide, the alkaline hydroxide being present not materially less than the molecular equivalent of 89 lbs. of sodium hydroxide per ton of flux and the water being present in the proportion of about 35% to 50% of the weight of the flux, the alkali hydroxide and the reactive aluminum being present in proportions sufficient to produce the aluminum hydroxide requisite to act as a binding agent for the discrete particles of the flux, and forming the resultant material into briquettes under a pressure of from 500 to 30,000 lbs. per square inch, said flux comprising at least one material from the group consisting of fluorspar, lime, corundum dross, and aluminum dross.

5. The process of manufacturing a fluxing agent from a finely divided flux which comprises making a slurry from said flux and a solution of 1% to 10% strength of at least one alkali hydroxide in the presence of aluminum, the aluminum being present in the proportion of not materially less than 1% by weight per ton of the flux and the alkali hydroxide being present in a proportion not materially less than the equivalent of 89 pounds of sodium hydroxide per ton of flux, the aluminum present in reactive form being in excess of the hydroxide whereby all of the hydroxide will be converted to aluminum hydroxide and a sufficient amount of aluminum hydroxide will be produced to serve as a binder for the discrete particles of the flux, and subjecting the resultant material to a pressure of from 500 to 30,000 lbs. per square inch to form the same into crush-resistant briquettes, said flux comprising at least one material from the group consisting of fluorspar, lime, corundum dross, and aluminum dross.

6. The process of manufacturing a fluxing agent from a finely divided flux which comprises making a slurry from said flux and a solution of 1% to 10% strength of at least one alkali hydroxide in the presence of aluminum, the slurry comprising about 35% to 50% by weight of water to the weight of flux, the aluminum being present in the proportion of not materially less than 1% by weight per ton of the flux and the alkali hydroxide being present in a proportion not materially less than the equivalent of 89 pounds of sodium hydroxide per ton of flux, the aluminum present in reactive form being in excess of the hydroxide whereby all of the hydroxide will be converted to aluminum hydroxide and a sufficient amount of aluminum hydroxide will be produced to serve as a binder for the discrete particles of the flux, subjecting the resultant material to a pressure of about 500 to 30,000 lbs. per square inch to form the same into crush-resistant briquettes, and drying the briquettes at an elevated temperature to form cohesive flux briquettes therefrom, said flux comprising at least one material from the group consisting of fluorspar, lime, corundum dross, and aluminum dross.

7. The process of manufacturing a fluxing agent from a finely divided flux which comprises making a slurry from said flux and a solution of 1% to 10% strength of at least one alkali hydroxide in the presence of aluminum, the slurry comprising substantially greater than 10% by weight of water to the weight of flux, the aluminum being present in the proportion of not materially less than 1% by weight per ton of the flux and the alkali hydroxide being present in a proportion not materially less than the equivalent of about 39.5 to 89 pounds of sodium hydroxide per ton of flux, the aluminum present in reactive form being in excess of the hydroxide whereby all of the hydroxide will be converted to aluminum hydroxide and a sufficient amount of aluminum hydroxide will be produced to serve as a binder for the discrete particles of the flux, subjecting the resultant material to a pressure of about 500 to 30,000 lbs. per square inch to form the same into crush-resistant briquettes, and drying the briquettes at an elevated temperature to form cohesive flux briquettes therefrom, said flux comprising at least one material from the group consisting of fluorspar, lime, corundum dross, and aluminum dross.

JAMES J. BOWDEN.
JOHN S. SUDA.

REFERENCES CITED

The following references are of record in the file of this patent:

UNITED STATES PATENTS

| Number | Name | Date |
|---|---|---|
| 1,739,839 | Jung | Dec. 1, 1929 |
| 2,283,622 | Boden et al. | May 19, 1942 |
| 2,363,371 | Vignos | Nov. 21, 1944 |
| 2,416,179 | Kemmer | Feb. 18, 1947 |